United States Patent
Patel et al.

(10) Patent No.: US 8,122,291 B2
(45) Date of Patent: Feb. 21, 2012

(54) METHOD AND SYSTEM OF ERROR LOGGING

(75) Inventors: Nehal K. Patel, Lincoln, CA (US);
Andrew C. Walton, Rocklin, CA (US);
Kenneth C. Duisenberg, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 93 days.

(21) Appl. No.: 12/691,512

(22) Filed: Jan. 21, 2010

(65) Prior Publication Data

US 2011/0179314 A1 Jul. 21, 2011

(51) Int. Cl.
*G06F 11/00* (2006.01)

(52) U.S. Cl. ............................ 714/31; 714/38.11

(58) Field of Classification Search .............. 714/31, 714/37, 38.11
See application file for complete search history.

(56) References Cited

U.S. PATENT DOCUMENTS

| | | | | |
|---|---|---|---|---|
| 5,267,246 A * | 11/1993 | Huang et al. | ........ | 714/45 |
| 6,502,208 B1 * | 12/2002 | McLaughlin et al. | ...... | 714/25 |
| 6,697,973 B1 * | 2/2004 | Baumeister et al. | ........ | 714/55 |
| 6,948,094 B2 | 9/2005 | Schultz et al. | | |
| 7,010,726 B2 * | 3/2006 | Faust et al. | ........ | 714/45 |
| 7,281,163 B2 * | 10/2007 | Brown et al. | ........ | 714/31 |
| 7,308,609 B2 * | 12/2007 | Dickenson et al. | ........ | 714/36 |
| 7,818,616 B2 * | 10/2010 | Kathail et al. | ........ | 714/15 |
| 2003/0120968 A1 * | 6/2003 | Andress et al. | ........ | 714/25 |
| 2008/0270842 A1 * | 10/2008 | Ho et al. | ........ | 714/42 |

OTHER PUBLICATIONS

Microsoft Computer Dictionary, Fifth Edition, 2002, p. 466.*
Intel, "Intel Itanium Processor Family Error Handling Guide," Apr. 2004, 52 pp.

* cited by examiner

*Primary Examiner* — Joshua Lohn

(57) ABSTRACT

Method and system of error logging. At least some of the illustrative embodiments are methods including detecting assertion of an error pin by a processor system, (comprising at least a main processor and a chipset, the assertion of the error pin an indication to reboot the processor system) the detecting by a reset circuit, notifying a management processor (distinct from the main processor) that the error pin is asserted (the notifying by the reset circuit), writing to a plurality of registers in the chipset (the writing by the management processor), de-asserting a reset pin of the main processor, and then executing by the main processor an error-handling code to generate an error log.

15 Claims, 3 Drawing Sheets

METHOD AND SYSTEM OF ERROR LOGGING

BACKGROUND

A global fatal error event is a system-wide broadcast of an error event that causes a computer system to reboot. In some cases, when the global fatal error event occurs the computer system reboots without executing error-handling code to generate an error log. Given that error detection, containment and recovery are important features of a reliable and robust computer system, any error detection system or method that can enhance the ability of the computer system to diagnose global fatal error events and log the errors provides a competitive advantage.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

"Processor system" shall mean one or more main processors coupled to one or more chipsets or a main processor with a chipset integrated into the main processor.

"Chipset" shall mean one or more integrated circuits that provide a communication pathway from a processor to one or more peripheral devices.

"Asserting a reset pin" shall mean any one of driving an active-low voltage to the reset pin, driving an active-high voltage to the reset pin, grounding the reset pin or driving the reset pin to a tri-state. However, for remainder of the specification "asserting a reset pin" will be referred to as driving an active-high voltage to the reset pin without limiting to active-high voltages.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
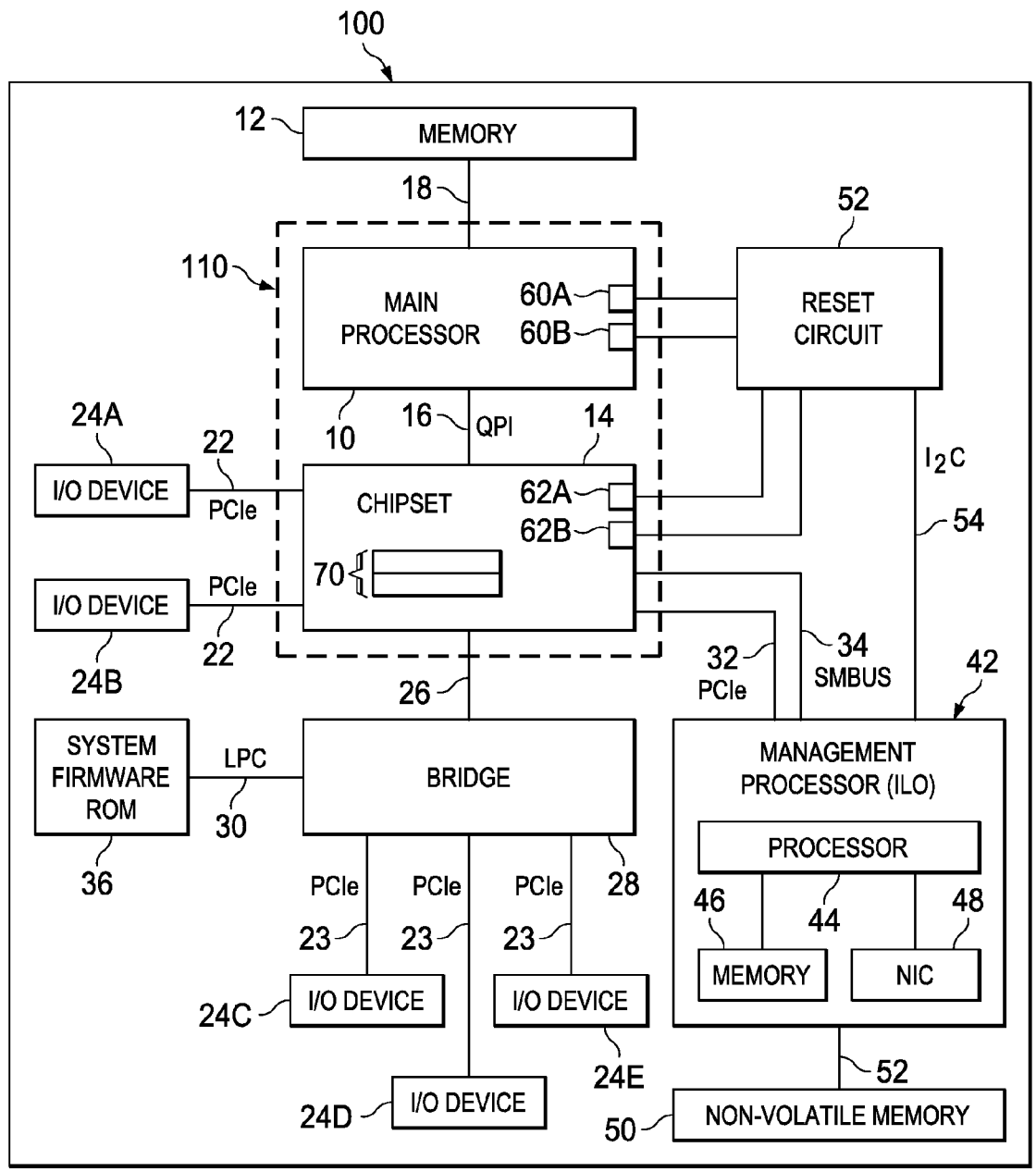
FIG. 1 shows a computer system in accordance with at least some of the embodiments.

FIG. 1 illustrates a computer system 100, in some embodiments a server computer system, constructed in accordance with at least some embodiments. In particular, computer system 100 comprises a main processor 10 coupled to a main memory array 12 and a chipset 14. In some embodiments, the main processor 10 couples to various other peripheral computer system components by way of the chipset 14. The main processor 10 couples to the chipset 14 by way of a chipset bus 16 (e.g., QuickPath Interconnect developed by Intel Corporation) to form a processor system 110 of the computer system 100. In other embodiments, the chipset 14 may be integrated into the main processor 10 to form a processor system 110 of the computer system 100. The computer system 100 may implement other bus configurations or bus-bridges in addition to, or in place of, those shown in FIG. 1. In some embodiments, the processor system 110 may comprises more than one main processor 10 coupled to one or more chipsets 14.

In some embodiments the chipset 14 couples to a plurality of input/output devices 24A-24B by way of peripheral component interconnect express (PCIe) buses, or any other suitable type of bus. The input/output devices may be devices such as video driver that may couple to a display device or a keyboard.

Main memory 12 couples to the main processor 10 through a memory bus 18. The main processor 10 comprises a memory control unit that controls transactions to the main memory 12 by asserting control signals for memory accesses. The main memory 12 functions as the working memory for the main processor 10 and comprises a memory device or array of memory devices in which programs, instructions and data are stored. The main memory 12 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 12 is an example of a computer-readable medium storing programs and instructions, and other examples are disk drives and flash memory devices.

Still referring to FIG. 1, the computer system 100 also comprises a bridge 28 that bridges the primary expansion bus 26 to various secondary expansion buses such as PCIe buses 23 and low pin count (LPC) bus 30. In accordance with some embodiments, the bridge 28 comprises an Input/Output Controller Hub (ICH) manufactured by Intel Corporation. Although the bridge 28 is shown in FIG. 1 to support only the PCIe buses 23 and LPC bus 30, various other secondary expansion buses, such as peripheral component interconnect (PCI) bus, or universal serial bus (USB) bus may be supported by the bridge 28. In the embodiments shown in FIG. 1, the primary expansion bus 26 comprises a Hub-link bus, which is a proprietary bus of the Intel Corporation. However, computer system 100 is not limited to any particular type of primary expansion bus, and thus other suitable buses may be equivalently used.

System firmware 36 couples to the bridge 28 by way of the LPC bus 32. In alternative embodiments, the system firmware 36 may be directly coupled to the main processor 10. The system firmware 36 comprises read-only memory (ROM) which contains software programs executable by the main processor 10. The software programs comprise not only programs to implement basic input/output system (BIOS) commands, but also instructions executed during and just after power on self tests (POST) procedures. The POST procedures as well as the memory reference code perform various functions within the computer system 100 before control of the computer system is turned over to the operating system.

Still referring to FIG. 1, illustrative computer system 100 further comprises management processor 42. The term "management processor" should not be read as limiting the functionality of the device to just that of a stand-alone processor. In some embodiments, management processor 42 is a stand-alone processor, while in other embodiments the management processor 42 is an application specification integrated circuit (ASIC) having a processor core, and other components (e.g., memory, and network interface devices). In yet still other embodiments, the management processor 42 is formed from a plurality of individual components grouped together physically, such as on a circuit board coupled within the computer system 100. In some cases, the management processor 42 remains powered and active even when the main processor 10 is powered-off, and thus is often referred to as an integrated lights out (ILO) processor.

In accordance the embodiments illustrated in FIG. 1, the management processor 42 comprises a processor core 44 coupled to memory 46. Thus, programs executed by processor core 44 may be stored in and/or executed from memory 46. Further, the management processor 42 comprises a network interface controller (NIC) 48. The NIC 48 is configured to couple the management processor 42 to a network, such as an Ethernet® network, and to enable the management processor 42 to communicate with external devices, such as remote computer. Further in accordance with the various embodiments, the management processor 42 communicatively couples to the chipset 14, and other computer system 100 components, by way of at least two communication pathways. For example, and as illustrated, the management processor 42 couples to the chipset 14 using both a PCIe bus 32 and a system management bus (SMbus) 34. In some embodiments, the management processor 42 couples to a non-volatile memory 50 by way of any suitable bus 52 that enables the management processor 42 to access the non-volatile memory 50. The non-volatile memory 50 comprises random access memory (RAM) that contains instructions that may be executed by various components of the computer system 100, and may also be the location where error logs and memory dumps are placed.

Still referring to FIG. 1, the computer system 100 also comprises a reset circuit 52 coupled to the management processor 42 by way of a reset bus 54 (e.g., Inter-Integrated Circuit (I2C) bus). The reset circuit 52 is also communicatively coupled to the main processor 10 and the chipset 14. In the particular embodiments, the reset circuit 52 couples to an error pin 60A and a reset pin 60B of the main processor 10, and the reset circuit 52 also couples to an error pin 62A and a reset pin 62B of the chipset 14. In some embodiments, the reset circuit 52 is a standalone device such as a field programmable gate array (FPGA) or programmable array logic (PAL), while in other embodiments the reset circuit 52 is an application specific integrated circuit (ASIC) having processor core, and other components.

In accordance with at least some embodiments, machine check abort (MCA) events are used to signal an error detected by main processor 10 or the chipset 14. MCA events are asynchronous events and have higher priority than processor interrupts, faults, and traps. In some embodiments, MCA events can be a global MCA event. In particular, a global MCA event is associated with an error detected in the main processor 10 or the chipset 14; however, the occurrence of the global MCA event is broadcasted to other components of the computer system 100. For example, if a global MCA event occurs due to an error in main processor 10, the chipset 14 is also notified of the global MCA event in the main processor 10, and vice versa. In some embodiments, the global MCA event in the main processor 10 or the chipset 14 is due to a fatal error. A fatal error is not correctable and causes the processor system 110 to reboot.

Consider for purpose of explanation that a global MCA event occurs in the main processor 10 due to a fatal error detected by the main processor 10. Upon detection of the fatal error the main processor 10 asserts the error pin 60A of the main processor 10. The reset circuit 52 detects the assertion of the error pin 60A by the main processor 10, and the reset circuit 52, responsive to the detection, asserts a reset pin 60B of the main processor 10 and asserts a reset pin 62B of the chipset 14. The assertion of the reset pin 62B of the chipset 14 causes the chipset 14 to clear contents of a plurality of registers 70 (e.g., 'non-sticky' registers) in the chipset 14. In the particular embodiments, clearing the plurality of registers 70 in the chipset 14, a communication pathway between the main processor 10 and downstream devices, such as the system firmware 36 and the non-volatile memory 50 is lost. When the communication pathway is lost the main processor 10 is unable to access and execute error handling code to generate an error log for the fatal error.

As another example of an error event, consider that a global MCA event occurs in the chipset 14 due a fatal error detected by the chipset 14, and the chipset 14 asserts the error pin 62A of the chipset 14. The reset circuit 52 detects the assertion of the error pin 62A by the chipset 14, and the reset circuit 52 asserts the reset pin 60B of the main processor 10 and asserts the reset pin 62B of the chipset 14. The assertion of the reset pin 62B of the chipset 14 causes the chipset 14 to clear contents of a plurality of registers 70 (e.g., 'non-sticky' registers) in the chipset 14, which causes the communication pathway between the main processor 10 and downstream devices, such as the system firmware 36 and the non-volatile memory 50, to be lost.

Regardless of where (i.e., main processor 10 or the chipset 14) in the processor system 110 the fatal error is detected, in accordance with at least some of the embodiments, the reset circuit 52 is configured to reestablish the communication pathway between main processor 10 and downstream devices, such as the system firmware 36 and the non-volatile memory 50. The reset circuit 52 detects the assertion of any one of the error pin 60A by the main processor 10 or the error pin 62A by the chipset 14, and the reset circuit 52 asserts the reset pin 60B of the main processor 10 and asserts the reset pin 62B of the chipset 14. As previously discussed, the assertion of reset pin 62B clears the plurality of registers 70 (e.g., 'non-sticky' registers) in the chipset 14. Thereafter, in accordance with the various embodiments, the reset circuit 52 de-asserts the reset pin 62B of the chipset 14, but continues to assert the reset pin 60B of the main processor 10.

As the reset circuit 52 de-asserts the reset pin 62A of the chipset, the reset circuit 52 also notifies the management processor 42 that the reset pin 62A of the chipset 14 has been de-asserted. The reset circuit 52 notifies the management processor 42 by sending an interrupt signal by way of the reset bus 54 to the management processor 42. However, other notification systems may be equivalently used. The management processor 42, responsive to the notification from the reset circuit 52, is configured to write to the plurality of registers 70 (e.g., 'non-sticky' registers) in the chipset 14 that were cleared due the assertion of the reset pin 62B. In some embodiments, the management processor 42 reads from the non-volatile memory 50 a data structure comprising addresses and values associated with the plurality of registers 70 in the chipset 14. The management processor 42 writes the addresses and values read from the non-volatile memory 50 to the plurality of registers 70 in the chipset 14 by way of the illustrative SMBus 34. Writing to the plurality of registers 70 in the chipset 14 by the management processor establishes the communication pathway between the main processor 10 and the system firmware 36 and non-volatile memory 50.

After the management processor 42 has completed writing (i.e., writing addresses and values from the non-volatile memory 50) to the plurality of registers 70 in the chipset 14, the management processor 42 notifies the reset circuit 52 by way of the reset bus 54 that the writing to the plurality of registers 70 in the chipset 14 has been completed. The reset circuit 52 responsive to the notification from the management processor 42, de-asserts the reset pin 60B of the main processor 10.

Thus, with the communication pathway established between the main processor 10 and the downstream devices, the main processor 10 accesses error-handling code from the system firmware 36, and the main processor 10 executes the error-handling code and generates an error log associated with the fatal error. In other embodiments, the error-handling code may be accessed from the non-volatile memory 50. In the particular embodiment, the generated error log may be stored in the non-volatile memory 50 for further processing. In other embodiments, the generated error log may be stored in an external storage device (e.g., disk drive, tape drive, or a storage area network) coupled to the computer system 100.

In accordance with some embodiments, the main processor does not clear the contents of the main memory 12 when the reset circuit 54 de-asserts the reset pin 60B of the main processor 10. Thus, after the main processor 10 has finished executing the error-handling code to generate the error log, the control is turned over to an operating system executed by the main processor 10. In particular, the control is turned over to the operating system's MCA event handler. The operating system's MCA event handler causes the main processor 10 to dump the contents of the main memory 12 into the non-volatile memory 50 for further processing. In other embodiments, the contents of the main memory 12 may be dumped into a storage device (e.g., disk drive, tape drive, or a storage area network) coupled to the computer system 100.

In accordance with some embodiments, the data structure comprising the addresses and values of the plurality of registers 70 (e.g., 'non-sticky' registers) in the chipset 14 is stored in the non-volatile memory 50 prior to the writing to the plurality of registers 70 by the management processor 42. In particular, the addresses and values of the plurality of registers 70 in the chipset 14 are stored in the non-volatile memory 50 when computer system 100 is initially booted. In some embodiments, the system firmware 36 may contain programs that can be executed when the computer system 100 is initially booted to periodically update the addresses and values of the plurality of registers 70 in the chipset 14 stored in the non-volatile memory 50. Thus, when the plurality of registers 70 are written to by the management processor 42, the plurality of register 70 are written with most recent addresses and values of the plurality of registers 70 stored in the non-volatile memory 50.

Figure 2A:
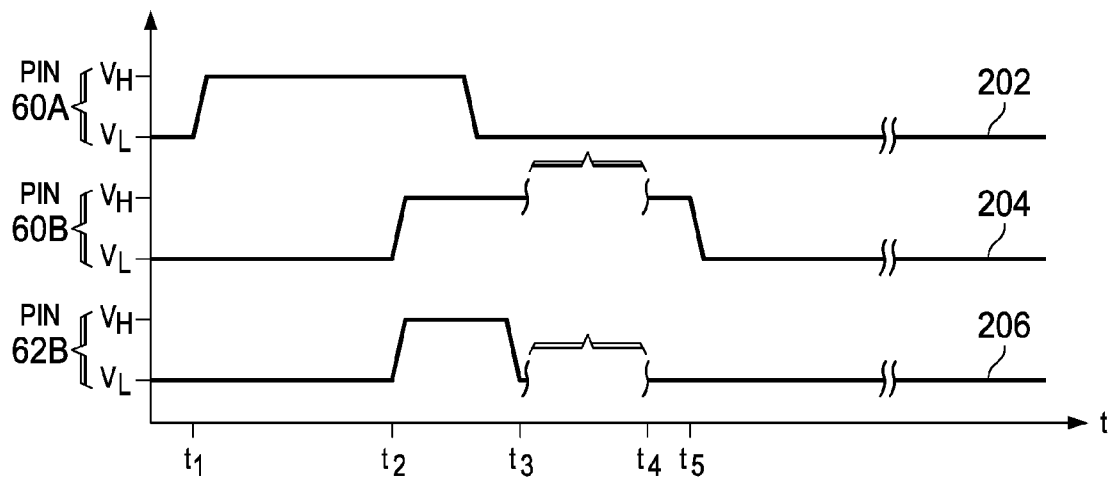
FIG. 2A shows a timing diagram in accordance with at least some of the embodiments.

Referring to FIG. 1 and FIG. 2A simultaneously, FIG. 2A shows a timing diagram of the error and reset pins after a fatal error has been detected by the main processor 10. In particular, FIG. 2A shows signal 202 of the error pin 60A of the main processor 10, signal 204 of the reset pin 60B of the main processor 10 and signal 206 of the reset pin 62B of the chipset 14. In an illustrative example, signal 202 is asserted at time $t_1$, for example when the main processor 10 detects the fatal error. Responsive to assertion of error pin 60A, reset circuit 52 asserts reset pin 60B at time $t_2$ as shown by signal 204, and also asserts reset pin 62B at time $t_2$ as shown by signal 206. The amount of time between $t_1$ and $t_2$ is merely illustrative, and in some cases assertion of the various reset signals of the main processor and chipset is immediately after assertion of error pin 60A indicating the error. Thereafter, the reset circuit 52 de-asserts the reset pin 62B of the chipset 14 at time $t_3$, while the reset pin 60B is maintained asserted. The plurality of registers 70 of the chipset 14 are written during the time period between $t_3$ and $t_4$. Once the writing to the registers 70 is complete, the reset circuit 52 de-asserts reset pin 60B at time $t_5$. Thereafter, the main processor 10 executes error-handling code to generate an error log associated with the fatal error.

Figure 2B:
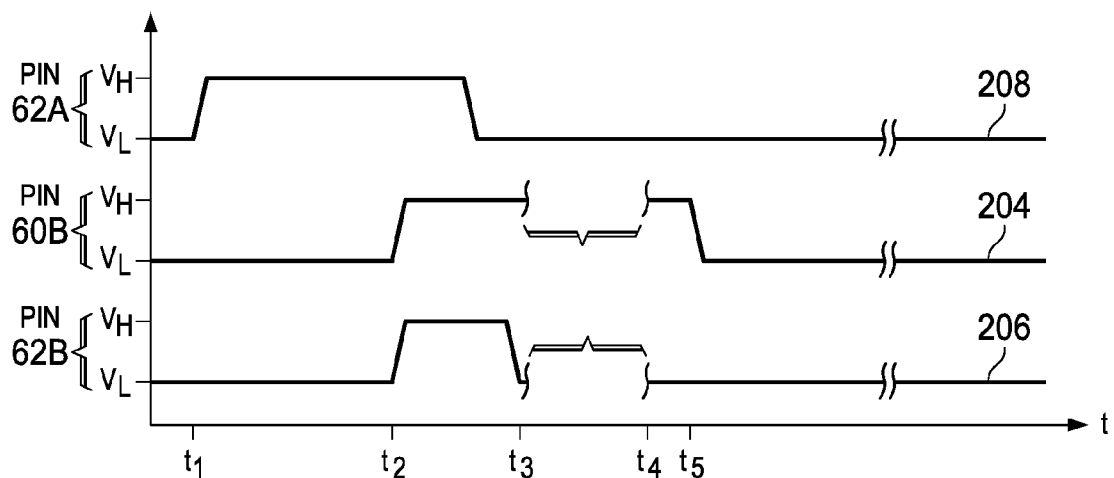
FIG. 2B shows a timing diagram in accordance with at least some of the embodiments.

FIG. 2B shows a timing diagram similar to the embodiments of the FIG. 2A, but shows a signal 208 of the error pin 62A of the chipset. In an illustrative example, signal 208 is asserted at time $t_1$, for example when the chipset 14 detects the fatal error. Responsive to assertion of error pin 62A, reset circuit 52 asserts reset pin 60B at time $t_2$ as shown by signal 204, and also asserts reset pin 62B at time $t_2$ as shown by signal 206. The amount of time between $t_1$ and $t_2$ is merely illustrative, and in some cases assertion of the various reset signals of the main processor and chipset is immediately after assertion of error pin 62A indicating the error. Thereafter, the reset circuit 52 de-asserts the reset pin 62B of the chipset 14 at time $t_3$, while the reset pin 60B is maintained asserted. The plurality of registers 70 of the chipset 14 are written during the time period between $t_3$ and $t_4$. Once the writing to the registers 70 is complete, the reset circuit 52 de-asserts reset pin 60B at time $t_5$. Thereafter, the main processer 10 executes error-handling code to generate an error log associated with the fatal error.

Figure 3:
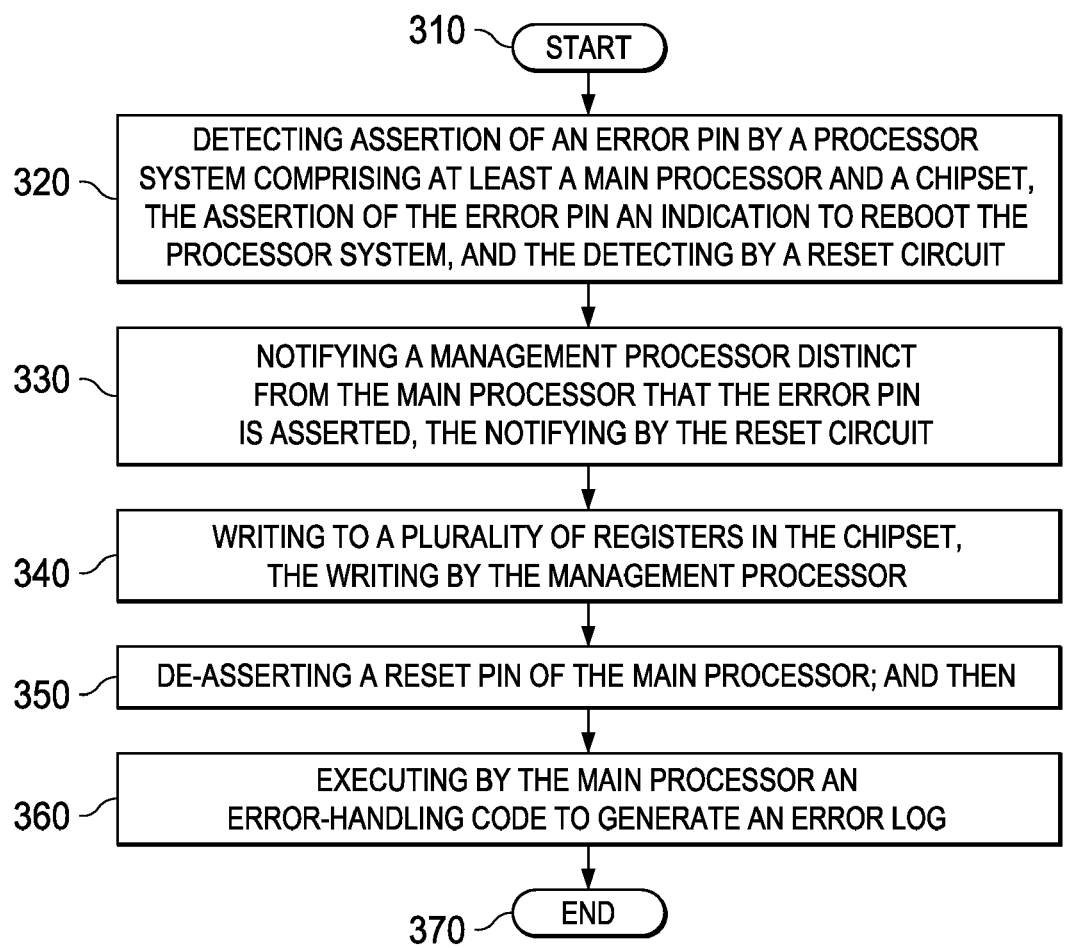
FIG. 3 shows a method in accordance with at least some of the embodiments.

FIG. 3 shows a method in accordance with at least some embodiments. In particular, the method starts (block 310), and proceeds to detecting assertion of an error pin by a processor system comprising at least a main processor and a chipset (block 320). In some embodiments, a reset circuit detects the assertion of the error pin. Thereafter, a management processor is notified by the reset circuit that the error pin is asserted (block 330), and the management processor writes to a plurality of registers in the chipset (block 340). Next, the reset circuit de-asserts a reset pin of the main processor (block 350), and then the main processor executes an error-handling code to generate an error log (block 360). The method ends (block 370).

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a computer-readable storage media for storing a software program to implement the method aspects of the various embodiments.

The above discussion is meant to be illustrative of the principles and various embodiments. Numerous variations and modifications will become apparent to those skilled in the art once the above disclosure is fully appreciated. For example, the system firmware 36 in the computer system 100 may be coupled directly to the main processor 10. Moreover, the processor system 110 in the embodiments of FIG. 1 may comprise plurality of processors. In other embodiments, the management processor 42 may be coupled directly to the bridge 28 PCIe bus 32. In yet still other embodiments, the error pin 60A and the reset pins 60B of the main processor may be a same reset pin. In such a situation, the main processor 10 notifies the reset circuit 52 of a fatal error by sending a signal over the reset pin, and responsive to the notification the reset circuit 52 asserts the reset pin. Similarly, the error pin 62A and the reset pin 62B of the chipset 14 may also be a same reset pin. It is intended that the following claims be interpreted to embrace all such variations and modifications.

What is claimed is:

1. A method comprising:
   detecting assertion of an error pin by a processor system comprising at least a main processor and a chipset, the assertion of the error pin an indication to reboot the processor system, and the detecting by a reset circuit;
   notifying a management processor distinct from the main processor that the error pin is asserted, the notifying by the reset circuit;
   writing to a plurality of registers in the chipset, the writing by the management processor;
   de-asserting a reset pin of the main processor; and then
   executing by the main processor an error-handling code to generate an error log; and
   prior to the notifying, asserting the reset pin of the main processor and asserting a reset pin of the chipset.

2. The method of claim 1 wherein the writing further comprising establishing a communication pathway between the main processor and a non-volatile memory, the non-volatile memory coupled to the management processor.

3. The method of claim 1 further comprising prior to the detecting, storing addresses and values of the plurality of registers in the chipset in a non-volatile memory coupled to the management processor.

4. The method of claim 3 wherein the writing further comprising:
   reading the addresses and values of the plurality of registers from the non-volatile memory; and
   writing the addresses and values in the plurality of registers in the chipset.

5. The method of claim 1 wherein detecting the assertion of the error pin in the processor system further comprises detecting a global machine check abort (MCA) event in the processor system.

6. The method of claim 1 wherein the executing further comprises dumping contents of a main memory coupled to the main processor.

7. A system comprising:
   a processor system comprising:
      a main processor;
      a chipset communicatively coupled to main processor;
   a memory coupled to the main processor;
   a reset circuit communicatively coupled to the processor system, the reset circuit configured to detect assertion of an error pin in the processor system;
   a management processor distinct from the main processor, the management processor communicatively coupled to the reset circuit, the management processor configured to receive a notification from the reset circuit of the assertion of the error pin, and the management processor further configured to write to a plurality of registers in the chipset responsive to the notification from the reset circuit;
   the reset circuit, after the writing to the plurality of registers in the chipset, is configured to de-assert a reset pin of the main processor; and
   the main processor, after the de-assertion of the reset pin, is configured to execute an error-handling code and generate an error log;
   wherein the reset circuit is configured to assert the reset pin of the main processor and a reset pin of the chipset prior to the writing to the plurality of registers in the chipset.

8. The system of claim 7 further comprising:
   a non-volatile memory coupled to the management processor, the non-volatile memory stores addresses and values of the plurality of registers in the chipset; and
   wherein the management processor is configured to read the addresses and values of the plurality of registers from the non-volatile memory, and the management processor is further configured to write the addresses and values in the plurality of registers in the chipset.

9. The system of claim 8 wherein the non-volatile memory is a scratch RAM.

10. The system of claim 7 wherein the reset circuit is at least one selected from the group consisting of: an application specification integrated circuit (ASIC); field-programmable gate array (FPGA); and programmable array logic (PAL).

11. The system of claim 7 wherein the main processor is further configured to dump the contents of the memory.

12. The system of claim 7 wherein when the reset circuit detects the assertion of the error pin, the reset circuit is configured to detect a global machine check abort (MCA) event in the processor system.

13. A system comprising:
   a reset circuit communicatively coupled to a processor system, the reset circuit configured to detect assertion of an error pin in the processor system, wherein the processor system comprises at least a main processor and a chipset;
   the reset circuit configured to notify a management processor distinct from the main processor of the assertion of the error pin, and the management processor responsive to the notification from the reset circuit configured to write to a plurality of registers in the chipset;
   the reset circuit, after the writing to the plurality of registers in the chipset, is configured to de-assert a reset pin of the main processor, and the main processor, after the de-assertion of the reset pin, is configured to execute an error-handling code and generate an error log;
   wherein the reset circuit is configured to assert the reset pin of the main processor and a reset pin of the chipset, prior to the writing to the plurality of registers in the chipset.

14. The system of claim 13 wherein the reset circuit is at least one selected from the group consisting of: an application specification integrated circuit (ASIC); field-programmable gate array (FPGA); and programmable array logic (PAL).

15. The system of claim 13 wherein when the reset circuit detects the assertion of the error pin, the reset circuit is configured to detect a global machine check abort (MCA) event in the processor system.

* * * * *